United States Patent [19]
Zhang

[11] Patent Number: 6,128,581
[45] Date of Patent: Oct. 3, 2000

[54] DYNAMIC DATUMMING FOR LAND AND MARINE MULTICOMPONENT SEISMIC DATA PROCESSING

[75] Inventor: Yaohui Zhang, Katy, Tex.

[73] Assignee: PGS Seres AS, Lysaker, Norway

[21] Appl. No.: 09/314,647

[22] Filed: May 19, 1999

[51] Int. Cl.$^7$ .................................................. G01V 1/28
[52] U.S. Cl. .................................................. 702/18
[58] Field of Search ............................. 702/14, 17, 18; 367/38, 73, 43, 47, 50, 51, 52, 54

[56] References Cited

U.S. PATENT DOCUMENTS

| | | | |
|---|---|---|---|
| 4,887,243 | 12/1989 | Pann ........................................... | 367/73 |
| 4,907,205 | 3/1990 | Yanchak ..................................... | 702/17 |
| 4,964,088 | 10/1990 | Chittineni ................................... | 702/18 |
| 5,173,880 | 12/1992 | Duren et al. ................................ | 367/73 |
| 5,502,687 | 3/1996 | Mackay ....................................... | 702/14 |
| 5,999,489 | 12/1999 | Lazaratos .................................... | 367/73 |

*Primary Examiner*—Donald E. McElheny, Jr.
*Attorney, Agent, or Firm*—Gordon T. Arnold; Arnold & Associates

[57] ABSTRACT

A method and device for processing a seismic survey data set including: an actual source location, an actual receiver location, and an actual reflection event location is provided. The actual source location and actual receiver location are over a first layer having a first layer velocity and a first layer ray parameter, and over a second layer having a second layer velocity different from the first layer velocity and a second layer ray parameter different from the first layer ray parameter. The actual reflection event location is located below the first layer. The method comprises: providing the first layer velocity; providing the second layer velocity; providing the first layer ray parameter; providing the second layer ray parameter; determining a correction factor for the position of a ray path end dependant upon the first and second layer velocities and the first and second layer ray parameters; and applying the correction factor to the ray path end, wherein a ray path-corrected ray path end is provided. The ray path end comprises a member of the group consisting of: the actual source location, the actual receiver location, and the actual reflection event location. The ray path corrected ray path end comprises a member of the group consisting of: the ray path corrected source location, the ray path corrected receiver location, and the ray path corrected reflection event location.

64 Claims, 4 Drawing Sheets

DYNAMIC DATUMMING FOR LAND AND MARINE MULTICOMPONENT SEISMIC DATA PROCESSING

BACKGROUND OF THE INVENTION

The present invention relates to the field of geophysical exploration, and more specifically to adaptation of data to account for position and elevation variations between sources and receivers (generally illustrated in FIG. 1 at source location (101) and receiver location (102)). Geophysical processing involves interpretation of seismic data (100) derived from a seismic source (101) and a seismic receiver (102). Ideally, the source (101) and the receiver (102) should be at a common elevation so that the interpretation of the geologic formations below can be more easily and correctly derived. This is very difficult to achieve in the field. Historically, to simulate this, seismic data processing and interpretation have involved mathematically shifting the source (101) and receiver (102) to a fictitious common elevation plane called a datum (110). However, reflection travel times are often affected by surface and near surface irregularities, including, for example, rapid changes in elevations and earth formations. These irregularities significantly distort the regular hyperbolic or non-hyperbolic moveouts. As such, the shift is ineffective.

Current attempts to remove these distortions involve applying field and residual static corrections to preconditioned data. The drifts of source and receiver location at the datum plane (110) will significantly affect the binning location and the seismic velocities derived from the statically corrected data, because the source and receiver points are only shifted vertically, for example, to a shifted source location (105) and a shifted receiver location (106). These are not the true locations where seismic waves propagate through the datum plane. Using this incorrect geometry to bin the data for processing results in incorrect velocities, even though the seismic gathers can still be flattened for stacking. Applying the incorrectly derived velocities, and possibly incorrect binning locations, results in an incorrect depth image of the subsurface geology.

Further, in the marine environment, when an ocean bottom seismic method is deployed to acquire seismic data, multi-component receivers are deployed on the sea floor (800) and the sources (101) are activated on the sea surface (801). As a result, there is a significant elevation difference between the source (101) and the receivers (102).

There is a great need for a new method and device wherein ray-path corrected source and receiver locations as well as reflection locations are used to obtain the proper geological and lithological information from the seismic data. It is an object of the invention to provide such a method and device.

SUMMARY OF THE INVENTION

It is an object of the present invention to overcome the shortcomings described above. In furtherance of that subject, according to one aspect of the invention, a method of processing a seismic survey data set including: an actual source location, an actual receiver location, and an actual reflection event location is provided. The actual source location and actual receiver location are over a first layer having a first layer velocity and a first layer ray parameter, and over a second layer having a second layer velocity different from the first layer velocity and a second layer ray parameter different from the first layer ray parameter. The actual reflection event location is located below the first layer. The method comprises: providing the first layer velocity; providing the second layer velocity; providing the first layer ray parameter; providing the second layer ray parameter; determining a correction factor for the position of a ray path end dependant upon the first and second layer velocities and the first and second layer ray parameter; and applying the correction factor to the ray path end, wherein a ray path-corrected ray path end is provided. The ray path end comprises a member of the group consisting of: the actual source location, the actual receiver location, and the actual reflection event location. The ray path corrected ray path end comprises a member of the group consisting of: the ray path corrected source location, the ray path corrected receiver location, and the ray path corrected reflection event location.

According to another aspect of the invention, a device for processing a seismic survey data set including: an actual source location, an actual receiver location, and an actual reflection event location is provided. The actual source location and actual receiver location are over a first layer having a first layer velocity and a first layer ray parameter, and over a second layer having a second layer velocity different from the first layer velocity and a second layer ray parameter different from the first layer ray parameter. The actual reflection event location is located below the first layer. The method comprises: a means for providing the first layer velocity; a means for providing the second layer velocity; a means for providing the first layer ray parameter; a means for providing the second layer ray parameter; a means for determining a correction factor for the position of a ray path end dependant upon the first and second layer velocities and the first and second layer ray parameter; and a means for applying the correction factor to the ray path end, wherein a ray path-corrected ray path end is provided. The ray path end comprises a member of the group consisting of: the actual source location, the actual receiver location, and the actual reflection event location. The ray path corrected ray path end comprises a member of the group consisting of: the ray path corrected source location, the ray path corrected receiver location, and the ray path corrected reflection event location.

It will be noted that the source location, receiver location, and reflection event location all constitute ray-path ends. Accordingly "ray-path end location" is used herein to describe the three locations generally. Furthermore the term "ray path corrected ray path end" is used to describe a ray path corrected source location, a ray path corrected receiver location, and a ray path corrected reflection event location.

Finally the term, ray parameter is used generally to describe various aspects of the subsurface geology. The ray parameter is dependent upon the velocity, and varies upon many conditions as is know to one of ordinary skill in the art. The ray parameter may be picked, determined automatically, determined in conjunction with the velocity; angle of refraction or any other method that would occur to one of ordinary skill in the art.

BRIEF DESCRIPTION OF THE DRAWINGS

The present invention is better understood by reading the following description of nonlimiting embodiments with reference to the attached drawings, wherein like parts in each of the several figures are identified by the same reference character.

DETAILED DESCRIPTION OF EXAMPLE EMBODIMENTS OF THE INVENTION

Figure 1:
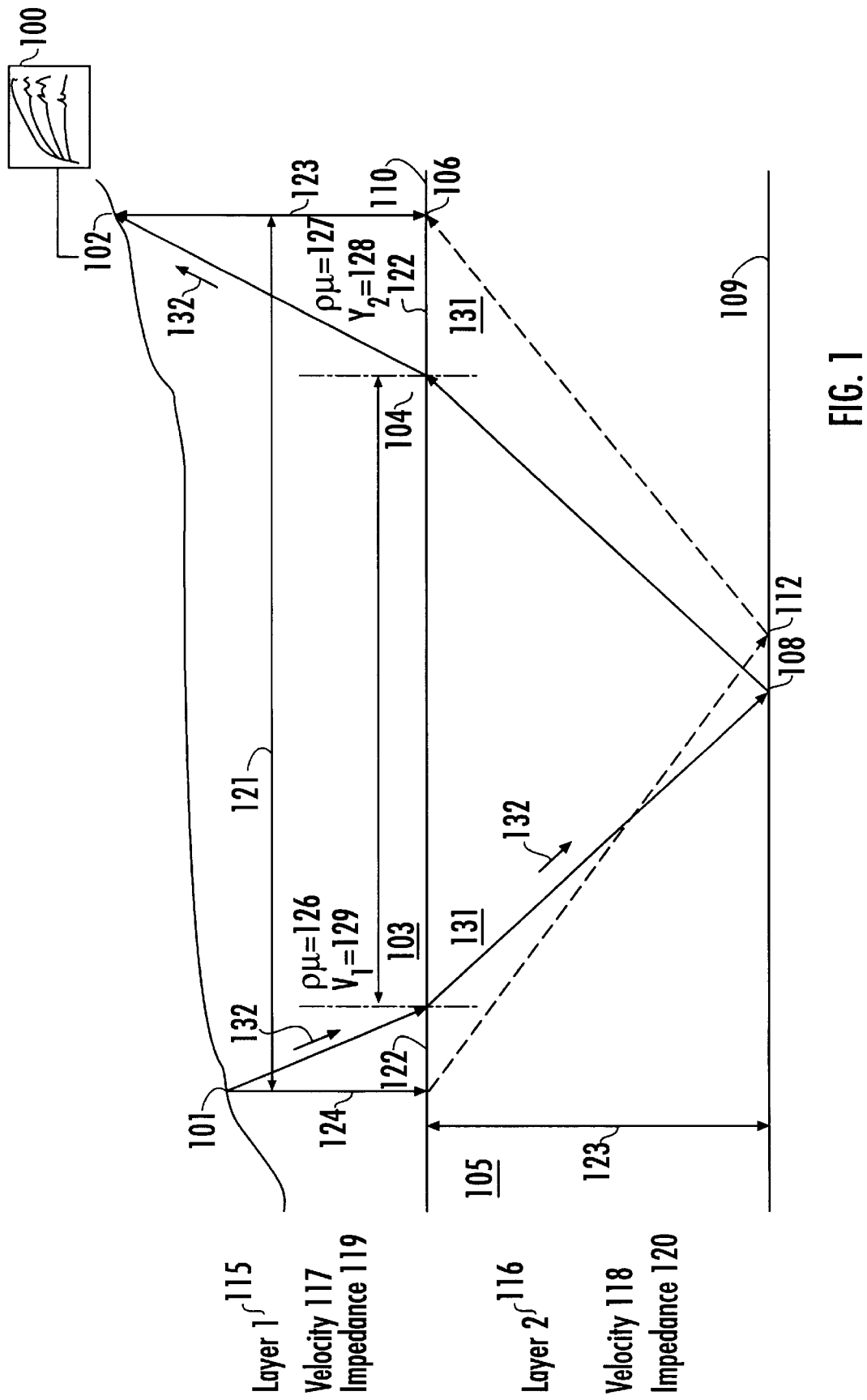
FIG. 1 is a diagram of aspects of the invention in the field from a cross section of the earth.

As illustrated in FIG. 1, a seismic survey data set (100) includes an actual source location (101) and an actual receiver location (102). The actual source location (101) and actual receiver locations (102) are over a first layer (115). Typically this first layer (115) is known as the low velocity, or soft earth, layer. This first layer (115) has a first layer velocity (117) and a first layer ray parameter (119). The actual source location (101) and actual receiver location (102) are also over a second layer (116). This second layer (116) will typically include the geologic formations of interest. This second layer (116) has a second layer velocity (118) different from the first layer velocity (117) and a second layer ray parameter (120) different from the first layer ray parameter (119). As one of ordinary skill in the art will recognize, the ray parameter is dependant upon velocity, and varies upon many characteristics of the subsurface geology. For example, impedance, density, isotropy, anisotropy, and velocity. The ray parameter may be determined by picking, automatically or manually. Alternatively, the ray parameter may be determined by the velocity or any other method that would occur to one of ordinary skill in the art. Furthermore, as is also known to one skilled in the art, the data set (100) is typically received on digital type computers in the field, however other computers may be used as well. Furthermore, typical sources include air guns, vibrators, and dynamite. Typical receivers include hydrophones, geophones, s-wave geophones, p-wave geophone, accelerometers, three component geophones, and hydrophones. Again, any other type of source or receiver that would occur to one of ordinary skill in the art may also be used. FIG. 1 further shows a common datum level (110) where a ray path corrected receiver location (104) and ray path corrected source location (103) are located. As stated above, these are also alternatively termed ray path corrected ray path ends.

Figure 2:
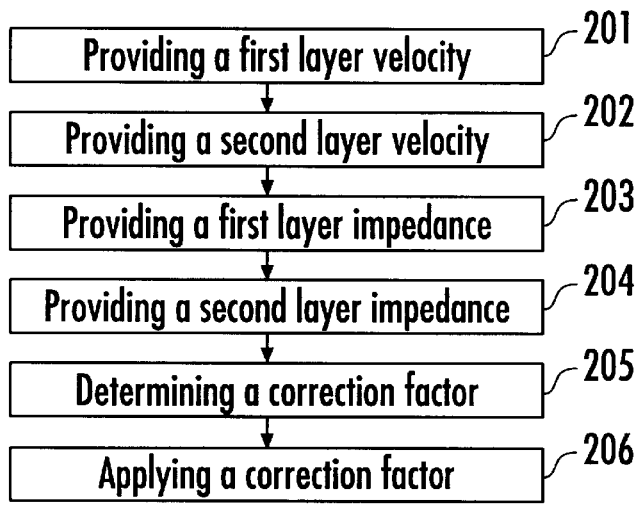
FIG. 2 is a diagram demonstrating aspects of the method of the invention.

As illustrated in FIG. 2, in one embodiment of the present invention, a method for determining a ray path corrected source position is provided comprising: providing the first layer velocity (201), providing the second layer velocity (202), providing the first layer ray parameter (203), and providing the second layer ray parameter (204). The method further comprises determining a correction factor (205) for the position of the actual source location (101), dependant upon the first (117) and second layer velocities (118) and the first (119) and second layer ray parameters (120). The method also comprises applying the correction factor (205) to the actual source location (101), wherein a ray path-corrected source position (103) is provided. As illustrated in FIG. 1, due to the refraction (131) of the seismic signal (132), simply redatumming or moving the actual source location (101) and actual receiver location (102) directly below to positions (105) (106) on the common datum level (110), as is currently done, will not correctly process the data (100). The correction factor (205) will reposition the actual source location (101) to a ray path-corrected source position (103). This will reflect the true ray path of the seismic signal (132).

In a further embodiment of the present invention, the method for determining a ray path corrected receiver location is provided comprising: determining a correction factor (205) for the actual receiver location (102) dependant upon the first (117) and second layer velocities (118) and the first (119) and second layer ray parameters (118). These values are provided as discussed below. The method further comprises applying the correction factor (205) to the actual receiver location (102), wherein a ray path-corrected receiver position (104) is provided. This correction factor (205) will reposition the actual receiver location (102) to the ray-path corrected receiver position (104) on the common datum level (110). As stated above, this ray path corrected receiver position is alternatively termed a ray path corrected ray path end.

In still a further embodiment of the present invention, a method of positioning a seismic reflection event location (112) in a pre-geometry corrected and pre-statics corrected seismic survey data set (100) is provided. The method further comprises determining a correction factor (205) for the seismic signal (132) dependant upon the first (117) and second layer velocities (118) and the first (119) and second layer ray parameters (120). These values are provided as discussed below. The method further comprises applying the correction factor (205) to the seismic signal reflection event (108), wherein a corrected seismic signal is provided (108). The corrected seismic signal (132) represents a ray path-corrected signal (132).

As discussed before, the receiver (102), source (101), and reflection event locations (108) are termed "ray path end locations," and various aspects of the present invention apply to any of the three. Furthermore, the ray path corrected receiver location (104), the ray path corrected source location (103) and the ray path corrected reflection event location (108) are termed "ray path corrected ray path ends."

Figure 3:
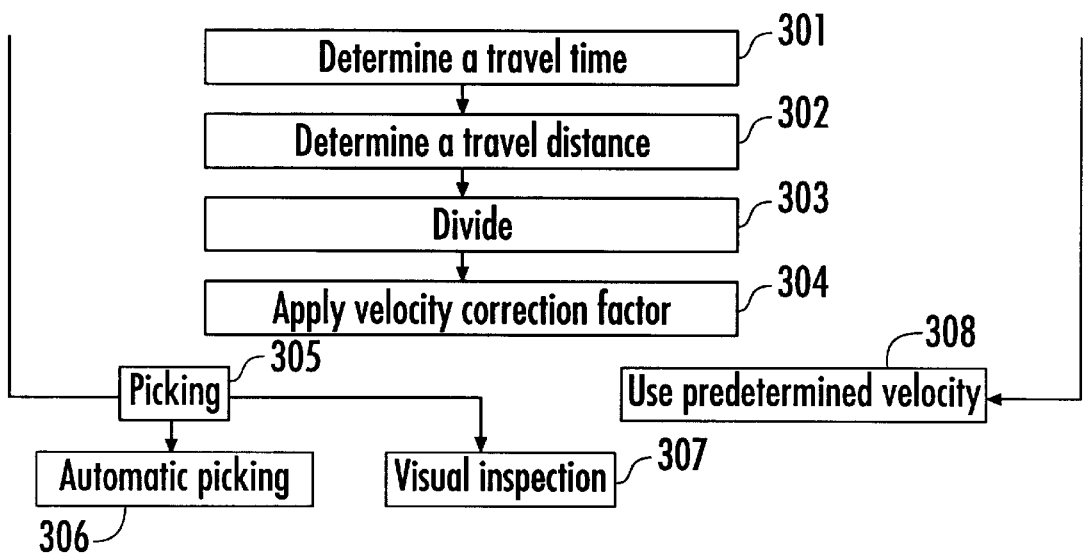
FIG. 3 is a diagram demonstrating aspects of providing the first and second layer velocities.

In an even further embodiment of the present invention, as illustrated in FIG. 3, the methods described above further comprise providing the first layer velocity (201). In one embodiment, the first layer velocity (201) is provided by providing a travel time (301) for the seismic survey data set (100), providing a travel distance (302) for the seismic survey data set (100), and dividing (303) the travel distance (302) by the travel time (301). Many methods for deriving and estimating travel times (301) and distances (302) are well known to those skilled in the art. Travel times of P—P and S—S reflected waves in a horizontally layered medium could be accurately approximated using a truncated power series. Standard Dix-style P—P and S—S wave velocity analysis methods are based on this theory with the moveout power series truncated at the hyperbolic term. Any of these methods, as well as those indicated herein, may be implemented in the present non-limiting embodiments of the invention.

In an even further embodiment, the travel time (301) essentially corresponds to:

$$t = \frac{\sqrt{d^2 + 4z^2}}{v_p + \Delta v_p}$$

As illustrated in FIG. 1, $v_p$ comprises the first layer velocity (117). d comprises a horizontal distance (121), along the common datum level (110), essentially from the source location (101) to the receiver location (102). $\Delta v_p$ comprises a velocity correction factor (304).

In a further embodiment of the present invention, the velocity correction factor (304) substantially corresponds to:

$$\Delta v_p = v_p \left( \sqrt{1 + \frac{2d\Delta d - (\Delta d)^2}{(d - \Delta d)^2 + 4z^2}} - 1 \right)$$

As illustrated in FIG. 1, $v_p$ comprises the first layer velocity (117). d comprises a distance (121) along the common datum level (110) essentially from the actual source location (101) to the actual receiver location (102). $\Delta d$ comprises a horizontal distance (122) along the common datum level (110) from below (105) the actual source location (101) to a ray path-corrected source position (103) and from a ray path-corrected receiver position (104) to below (106) the actual receiver location (102). z comprises a depth (123) of a reflection event (108).

In further embodiment, the velocity correction factor (304) substantially corresponds to:

$$\Delta v_p = \frac{d\Delta d}{(d - \Delta d)^2 + 4z^2} v_p$$

As shown in FIG. 1, $v_p$ comprises the first layer velocity (117). d comprises a distance (121) along the common datum level (110) essentially from below (105) the actual source location (101) to below (106) the actual receiver location (102). $\Delta d$ comprises a horizontal distance (122), along the common datum level (110), from below (106) the actual source location (101) to a ray path-corrected source position (103) and from a ray path-corrected receiver position (104) to below (106) the actual receiver location (102); and z comprises a depth (123) of a reflection event (108).

In an even further embodiment of the present invention, as illustrated in FIG. 3, providing the first layer velocity (201) comprises picking (305). Many methods of picking (301) are known to those skilled in the art. Such methods include coherency scan on time-distance curves, and any other picking methods that would occur to one of ordinary skill in the art. In alternative embodiments of the present invention, the picking (305) further comprises visual inspection (307) of the seismic survey data (100) or picking (305) further comprises automatic picking (306). Many automatic picking programs exist such as interactive graphic interfaces. These programs are run on workstation type computers and can be performed both onshore and offshore. Any other picking process that would occur to those of ordinary skill in the art may of course be used. In alternate embodiments, the ray parameter may also be predetermined. In another embodiment of the invention, the first layer velocity (201) is predetermined (308).

In a further embodiment of the invention, the providing the second layer velocity (202) is performed in substantially the same way as the providing the first layer velocity (201). As one of ordinary skill in the art would recognize, providing the second layer velocity (202) is independent of, and must not necessarily use the same method as providing the first layer velocity (201), although the same methods are available. For example, the first layer velocity (117) may be provided (201) by picking (305), while the second layer velocity (118) may be provided (202) by using a predetermined value (308).

In an even further embodiment of the present invention, providing the first layer ray parameter (203) and providing the second layer ray parameter (204) are dependent upon the first layer velocity (201) and the second layer velocity (202). Still, in alternative embodiments, the first layer ray parameter (119) and second layer ray parameter are predetermined (120).

Figure 4:
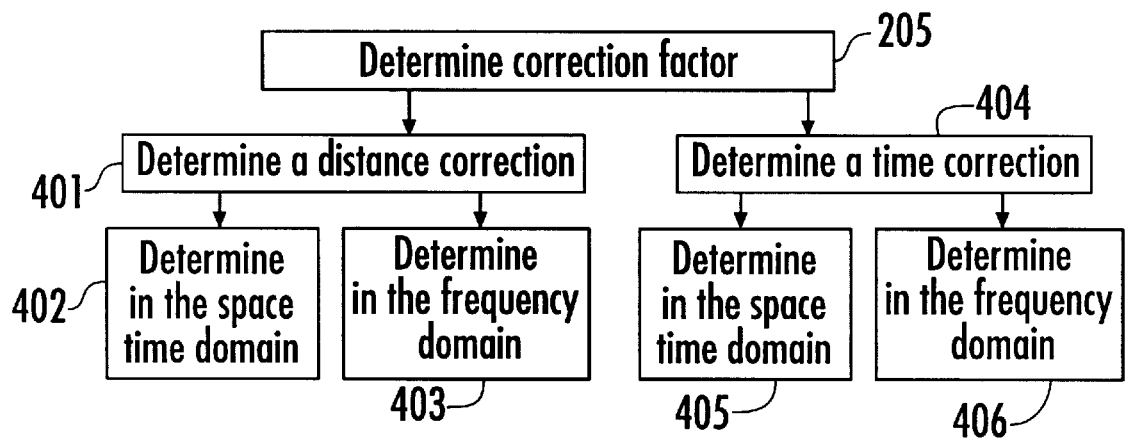
FIG. 4 is a diagram demonstrating aspects of determining a correction factor.

In a further embodiment of the present invention, as illustrated in FIG. 4, the determining a correction factor (205) comprises determining a distance correction (401). The distance correction (401) further comprises the total distance (122), as shown in FIG. 1, along the common datum level (110), from a location (105) below the actual source location (101) to a ray path-corrected source position (103) and from a ray path-corrected receiver position (104) to a location (106) below the actual receiver location (102).

In alternative embodiments of the present invention, the distance correction (401) is determined in the space-time domain (402) or in the frequency domain (403).

In a further embodiment of the present invention, the distance correction (401) corresponds essentially to:

$$\frac{z_s v_1 p_d}{\sqrt{1 - (p_d v_1)^2}} + \frac{z_r v_2 p_u}{\sqrt{1 - (p_u v_2)^2}}$$

$z_S$ comprises a distance (124) between the actual source location (101) and the common datum level (110). $z_r$ comprises a distance (125) between the actual receiver location (102) and the common datum level (110). $v_1$ comprises a velocity essentially above (129) the common datum level (110). $v_2$ comprises a velocity essentially above (128) the common datum level (110). $p_d$ comprises a ray parameter (126) for the signal (132). $p_u$ comprises a ray parameter (127) for the signal (132). $p_d$ (126) and $p_u$ (127) are dependent upon providing the first layer velocity (201), providing the second layer velocity (202), providing the first layer ray parameter (203), and providing the second layer ray parameter (204).

In a further embodiment of the present invention, the determining a correction factor (205) comprises determining a time correction (404). The time correction (404) further comprises the total time (133) traveled by the signal (132) from the actual source location (101) to a ray path-corrected source position (103) and from a ray path-corrected receiver position (104) to the actual receiver location (102).

In a further embodiment of the present invention, the time correction (404) is dependant upon determining a distance correction (401). In alternate embodiments of the present invention, the time correction (404) is determined in the space-time domain (405) or in the frequency domain (406).

In a further embodiment of the present invention, the time correction (404) corresponds essentially to:

$$\frac{z_s}{v_1} \frac{1}{\sqrt{1 - (p_d v_1)^2}} + \frac{z_r}{v_2} \frac{1}{\sqrt{1 - (p_u v_2)^2}}$$

As shown in FIG. 1, $z_S$ comprises a distance (124) between the actual source location (101) and the common datum level (110). $z_r$ comprises a distance (125) between the actual receiver location (102) and the common datum level (110). $v_1$ comprises a velocity (129) essentially above the common datum level (110). $v_2$ comprises a velocity (128) essentially above the common datum level (110). $p_d$ comprises a ray parameter (126) for the signal (132) and $p_u$ comprises a ray parameter (127) for the signal (132). $p_d$ (126) and $p_u$ (127) are dependent upon the providing the first layer velocity (201), providing the second layer velocity (202), providing the first layer ray parameter (203), and providing the second layer ray parameter (204).

In a further embodiment of the present invention, the seismic survey data set (100) comprises a seismic signal (132) which has been refracted (131) between the actual source location (101) and the actual receiver location (102). In a further embodiment of the present invention, the seismic survey data set (100) comprises a seismic signal (132) which has been reflected (108) between the actual source location (101) and the actual receiver location (102).

In a further embodiment of the present invention, the applying (206) the correction factor (205) comprises repositioning the actual source location (101) to a ray path-corrected source position (103).

In a further embodiment of the present invention, a correction factor (205) for the position of the receiver location (104) dependant upon the first (117) and second layer velocities (118) the first (119) and second layer ray parameter (120) is provided. Also provided is applying the correction factor (205) to the actual receiver location (102), wherein a ray path-corrected receiver position (104) is provided.

In a further embodiment of the present invention, the method further comprises determining a correction factor (205) for the position (108) of a seismic reflection event location (108) dependant upon the first (117) and second layer velocities (118) and the first (119) and second layer ray parameters (120); and applying (206) the correction factor (205) to the actual seismic reflection event location (108), wherein a ray path corrected reflection event location (108) is provided.

Figure 5:
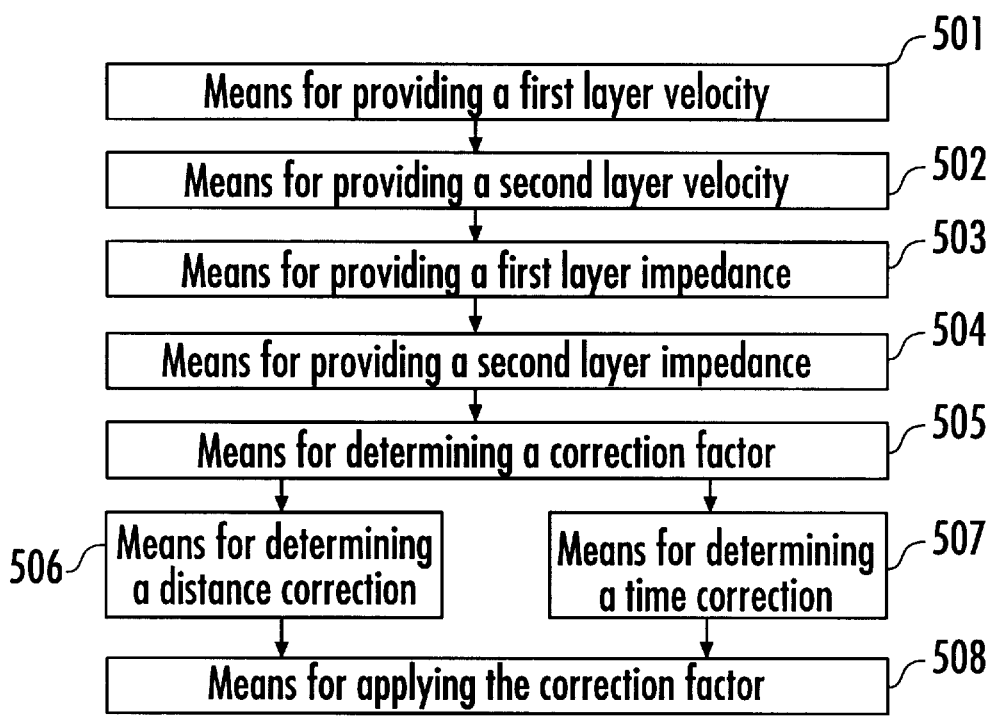
FIG. 5 is a diagram demonstrating aspects of the device of the invention.

In a further embodiment of the present invention, a device is provided for correcting a seismic source location (101) in a seismic survey data set (100) to a common datum level (110) with a receiver location (104) in the seismic survey data set (100). As illustrated in FIG. 5, the device comprises a means for providing the first layer velocity (501), a means for providing the second layer velocity (502), a means for providing the first layer ray parameter (503), and a means for providing the second layer ray parameter (504). Also provided is a means for providing a correction factor (505) for the position of the actual source location (101) dependant upon the first (117) and second layer velocities (118) and the first (119) and second layer ray parameters (120). Furthermore, a means for applying (508) the correction factor (505) to the actual source location (101) is provided, wherein a ray path-corrected source position (103) is provided. As is known in the art computers are frequently used to process seismic data. Such computers used in the art are often workstations and are utilized in conjunction with various aspects of the present invention. Of course, any other computers that would occur to one of ordinary skill in the art may also be used.

As discussed above, the receiver (102), source (101) and reflection event locations (108) are termed "ray path end locations," and various aspects of the present invention apply to any of the three. Furthermore, the ray path corrected receiver location (104), the ray path corrected source location (103) and the ray path corrected reflection event location (108) are termed "ray path corrected ray path ends."

In a further embodiment of the present invention, a means for determining a correction factor (505) for the position of the receiver location (102) dependant upon the first (117) and second (118) layer velocities and the first (119) and second (120) layer ray parameters is provided. Also provided, is a means for applying (508) the correction factor (505) to the actual receiver location (102), wherein a ray path-corrected receiver position (104) is provided.

In a further embodiment of the present invention, a means for applying a correction factor (508) to the seismic signal reflection event (108), wherein a corrected seismic signal (132) is provided, the corrected seismic signal (132) representing a ray path-corrected signal (132). In alternate embodiments, the correction factor (508) may be applied to the actual source location (101), the actual receiver location (102) and the seismic signal reflection event (108).

Figure 6:
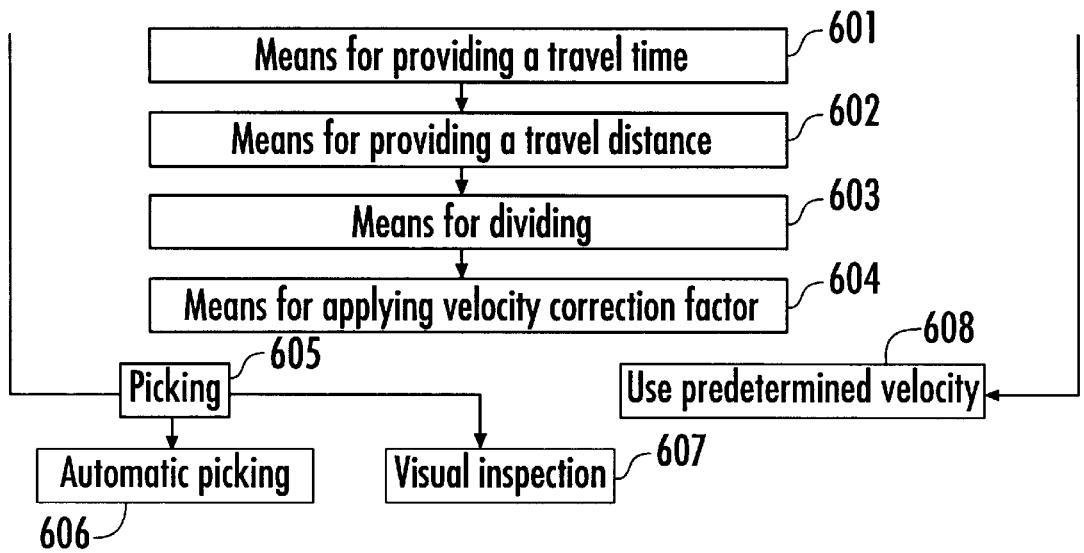
FIG. 6 is a diagram of aspects of a device for providing first and second layer velocities.

In a further embodiment of the present invention, as illustrated in FIG. 6, a means for providing the first layer velocity is provided comprising (507): a means for providing a travel time (601) for the seismic survey data set (100). Also provided, is a means for providing a travel distance (602) for the seismic survey data set (100); and a means for dividing (603) the travel distance (602) by the travel time (601). The device provides travels times as described above.

In a further embodiment of the present invention, a means for providing the first layer velocity (501) and a means for provided a second layer velocity (502) comprises a means for picking (605). Typically, this will include workstation type computers, and programs such as interactive graphic interface. Of course, another computer and programs that would occur to one of ordinary skill in the art may also be used. Alternatively, a means for picking (605) further comprises visual inspection (607) of the seismic survey data (100). Often, the device will also comprise predetermined values for the first (117) and second layer (118) velocities.

In a further embodiment of the present invention, a means for providing (503) the first layer ray parameter (119) and a means for providing (504) a second layer ray parameter (120) is provided. The means for providing (503) the first layer ray parameter (119) and a means for providing (504) a second layer ray parameter (120) are dependent upon the means for providing (501) the first layer velocity (117) and the means for providing (502) the second layer velocity (118). Typically, but not exclusively, computers such as workstations will be used. Alternatively, the first layer ray parameter (119) and second layer ray parameter (120) is predetermined.

In an even further embodiment of the present invention, the means for determining a correction factor (505) comprises a means for determining a distance correction (506). Such means typically will be computers, such as digital computers. The device will determine distance corrections (506) as in the method above.

In a further embodiment of the present invention, the means for determining a correction factor (505) comprises a means for determining a time correction (507). Such means typically will be computers such as digital computers. The device will determine time corrections (507) as in the method above.

In still a further embodiment of the present invention, a means for applying the correction factor (508) repositions the actual source location (101) to a ray path-corrected source position (103). In alternative embodiments, the means for applying the correction factor (508) repositions the actual receiver (102) location to a ray path-corrected receiver position (104) and the means for applying the correction factor (508) repositions the seismic reflection event location (108). Of course, in further embodiments of the present invention the correction factor (505) may be applied (508) to the actual source location (101), the actual receiver location (102) and the reflection event location (108).

Figure 7:
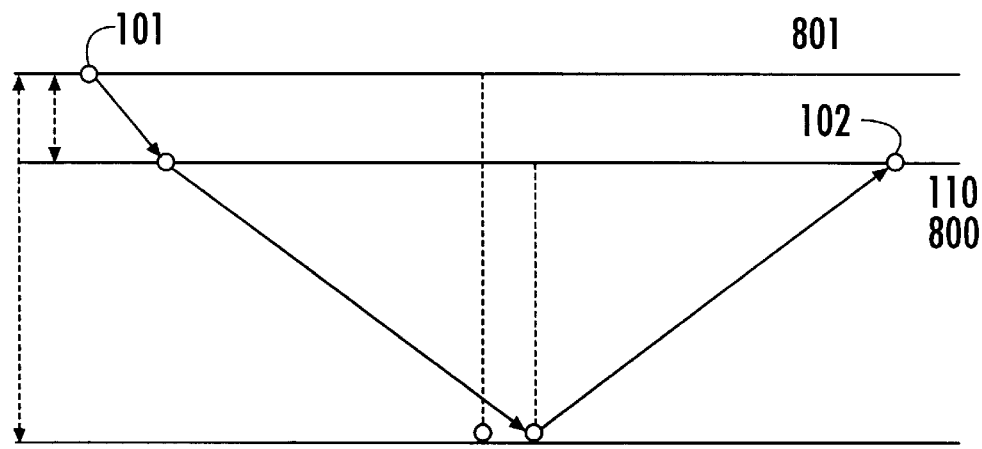
FIG. 7 is a diagram of aspects of the invention from a cross section of the earth in the marine environment.

In the marine environment, as illustrated in FIG. 7, the sea floor (800) is chosen to be the datum plane (110). In the marine environment the source (101) is on the surface of the ocean, (801) while the receiver (102) is often located on the floor (800).

I claim:

1. A method of processing a seismic survey data set including: an actual source location, an actual receiver location, and an actual reflection event location, wherein the actual source location and actual receiver location are over a first layer having a first layer velocity and a first layer ray parameter and over a second layer having a second layer velocity different from the first layer velocity and a second layer ray parameter different from the first layer ray parameter, and the actual reflection event location is located below the first layer, the method comprising:

providing the first layer velocity;

providing the second layer velocity;

providing the first layer ray parameter;

providing the second layer ray parameter;

determining a correction factor for the position of a ray path end dependant upon the first and second layer velocities and the first and second layer ray parameters; and applying said correction factor to said ray path end, wherein a ray path-corrected ray path end is provided;

wherein said ray path end comprises a member of the group consisting of: an actual source location, an actual receiver location, and an actual reflection event location; and wherein said ray path corrected ray path end comprises a member of the group consisting of: a ray path corrected source location, a ray path corrected receiver location, and a ray path corrected reflection event location.

2. The method of claim 1, wherein said providing the first layer velocity comprises:

providing a travel time for said seismic survey data set;

providing a travel distance for said seismic survey data set; and dividing said travel distance by said travel time.

3. The method of claim 2, wherein said travel time essentially corresponds to:

$$t=(d^2+4z^2)^{1/2}/(v_p+\Delta v_p);$$

wherein $v_p$ comprises the first layer velocity;

d comprises a horizontal distance essentially from said source location to said receiver location;

$\Delta v_p$ comprises a velocity correction factor; and z comprises a depth of a reflection event.

4. The method of claim 3, wherein said velocity correction factor substantially corresponds to:

$$\Delta v_p=[v_p((1+(2d\Delta d-(\Delta d)^2)/(d-\Delta d)^2+4z^2))^{1/2}-1]$$

wherein;

$v_p$ comprises the first layer velocity;

d comprises a distance along the common datum level essentially from below said actual source location to below said actual receiver location;

$\Delta d$ comprises a horizontal distance, along said common datum level, from below said actual source location to a ray path-corrected source position and from a ray path-corrected receiver position to below said actual receiver location; and z comprises a depth of a reflection event.

5. The method of claim 3, wherein said velocity correction factor substantially corresponds to:

$$\Delta v_p=v_p[d\Delta d/(d-\Delta d)^2+4z^2]$$

wherein;

$v_p$ comprises the first layer velocity;

d comprises a distance along the common datum level essentially from below said actual source location to below said actual receiver location;

$\Delta d$ comprises a horizontal distance, along said common datum level, from below said actual source location to a ray path-corrected source position and from a ray path-corrected receiver position to below said actual receiver location; and z comprises a depth of a reflection event.

6. The method of claim 1, wherein said providing the first layer velocity comprises picking.

7. The method of claim 6, wherein said picking further comprises visual inspection of said seismic survey data.

8. The method of claim 6, wherein said picking further comprises automatic picking.

9. The method of claim 1, wherein the first layer velocity is predetermined.

10. The method of claim 1, wherein said providing the second layer velocity comprises:

providing a travel time for said seismic survey data set;

providing a travel distance for said seismic survey data set; and dividing said travel distance by said travel time.

11. The method of claim 10, wherein said travel time essentially corresponds to:

$$t=(d^2+4z^2)^{1/2}/(v_p+\Delta v_p);$$

wherein $v_p$ comprises the second layer velocity;

d comprises a horizontal distance essentially from said source location to said receiver location;

$\Delta v_p$ comprises a velocity correction factor; and z comprises a depth of a reflection event.

12. The method of claim 11, wherein said velocity correction factor substantially corresponds to:

$$\Delta v_p=[v_p((1+(2d\Delta d-(\Delta d)^2)/(d-\Delta d)^2+4z^2))^{1/2}-1]$$

wherein;

$v_p$ comprises the second layer velocity;

d comprises a distance along the common datum level essentially from below said actual source location to below said actual receiver location;

$\Delta d$ comprises a horizontal distance, along said common datum level, from below said actual source location to a ray path-corrected source position and from a ray path-corrected receiver position to below said actual receiver location; and z comprises a depth of a reflection event.

13. The method of claim 11, wherein said velocity correction factor substantially corresponds to:

$$\Delta v_p=v_p[d\Delta d/(d-\Delta d)^2+4z^2]$$

wherein;

$v_p$ comprises the second layer velocity;

d comprises a distance along the common datum level essentially from below said actual source location to below said actual receiver location;

$\Delta d$ comprises a horizontal distance, along said common datum level, from below said actual source location to a ray path-corrected source position and from a ray path-corrected receiver position to below said actual receiver location; and z comprises a depth of a reflection event.

14. The method of claim 1, wherein said providing the second layer velocity comprises picking.

15. The method of claim 14, wherein said picking further comprises visual inspection of said seismic survey data.

16. The method of claim 14, wherein said picking further comprises automatic picking.

17. The method of claim 1, wherein said providing the first layer ray parameter is dependent upon said providing the first layer velocity and said providing the second layer velocity.

18. The method of claim 1, wherein said first layer ray parameter is predetermined.

19. The method of claim 1, wherein said providing the second layer ray parameter is dependant upon said providing the first layer velocity and said providing the second layer velocity.

20. The method of claim 1, wherein said second layer ray parameter is predetermined.

21. The method of claim 1, wherein said determining a correction factor comprises determining a distance correction.

22. The method of claim 21, wherein said distance correction further comprises the total distance, along the common datum level, from a location below said actual source location to a ray path-corrected source position and from a ray path-corrected receiver position to a location below said actual receiver location.

23. The method of claim 21, wherein said distance correction is determined in the space-time domain.

24. The method of claim 21, wherein said distance correction is determined in the frequency domain.

25. The method of claim 21, wherein said distance correction corresponds essentially to:

$$[(z_S)(p_d)(v_1)/(1-(p_d)(v_1))^2)^{1/2}]+[(z_r)(p_u)(v_2)/(1-((p_u)(v_2))^2)^{1/2}];$$

wherein $z_S$ comprises a distance between said actual source location and said common datum level;

$z_r$ comprises a distance between said actual receiver location and said common datum level;

$v_1$ comprises a velocity essentially above said common datum level;

$v_2$ comprises a velocity essentially above said common datum level;

$p_d$ comprises a ray parameter for said signal; and $p_u$ comprises a ray parameter for said signal; wherein $p_d$ and $p_u$ are dependent upon said providing the first layer velocity, providing the second layer velocity, providing the first layer ray parameter, and providing the second layer ray parameter.

26. A method as in claim 1, wherein said determining a correction factor comprises determining a time correction.

27. A method as in claim 26, wherein said time correction further comprises the total time traveled by said signal from said actual source location to a ray path-corrected source position and from a ray path-corrected receiver position to said actual receiver location.

28. The method of claim 26, wherein said time correction is dependant upon determining a distance correction.

29. The method of claim 26, wherein said time correction is determined in the space-time domain.

30. The method of claim 26, wherein said time correction is determined in the frequency domain.

31. The method of claim 26, wherein said time correction corresponds essentially to:

$$[(z_S/v_1)(1/(1-(p_d v_1)^2)^{1/2}]+[(z_r/v_2)(1/(1-(p_u v_2)^2)^{1/2}];$$

wherein $z_S$ comprises a distance between said actual source location and said common datum level;

$z_r$ comprises a distance between said actual receiver location and said common datum level;

$v_1$ comprises a velocity essentially above said common datum level;

$v_2$ comprises a velocity essentially above said common datum level;

$p_d$ comprises a ray parameter for said signal; and $p_u$ comprises a ray parameter for said signal; wherein $p_d$ and $p_u$ are dependent upon said providing the first layer velocity, providing the second layer velocity, providing the first layer ray parameter, and providing the second layer ray parameter.

32. The method of claim 1, wherein said applying said correction factor comprises repositioning said ray path end to a ray path-corrected ray path end.

33. A device for processing a seismic survey data set including: an actual source location, an actual receiver location, and an actual reflection event location, wherein the actual source location and actual receiver location are over a first layer having a first layer velocity and a first layer ray parameter and over a second layer having a second layer velocity different from the first layer velocity and a second layer ray parameter different from the first layer ray parameter, and the actual reflection event location is located below the first layer, the method comprising:

a means for providing the first layer velocity;

a means for providing the second layer velocity;

a means for providing the first layer ray parameter;

a means for providing the second layer ray parameter;

a means for determining a correction factor for the position of a ray path end dependant upon the first and second layer velocities and the first and second layer ray parameters; and a means for applying said correction factor to said ray path end, wherein a ray path-corrected ray path end is provided;

wherein said ray path end comprises a member of the group consisting of: an actual source location, an actual receiver location, and an actual reflection event location; and wherein said ray path corrected ray path end comprises a member of the group consisting of: a ray path corrected source location, a ray path corrected receiver location, and a ray path corrected reflection event location.

34. The device of claim 33, wherein said means for providing the first layer velocity comprises:

a means for providing a travel time for said seismic survey data set;

a means for providing a travel distance for said seismic survey data set; and a means for dividing said travel distance by said travel time.

35. The device of claim 34, wherein said travel time essentially corresponds to:

$$t=(d^2+4z^2)^{1/2}/(v_p+\Delta v_p);$$

wherein $v_p$ comprises the first layer velocity;

d comprises a horizontal distance essentially from said source location to said receiver location;

$\Delta v_p$ comprises a velocity correction factor; and z comprises a depth of a reflection event.

36. The device of claim 35, wherein said velocity correction factor substantially corresponds to:

$$\Delta v_p=[v_p((1+(2d\Delta d-(\Delta d)^2)/(d-\Delta d)^2+4z^2))^{1/2}-1]$$

wherein;

$v_p$ comprises the first layer velocity;

d comprises a distance along the common datum level essentially from below said actual source location to below said actual receiver location;

$\Delta d$ comprises a horizontal distance, along said common datum level, from below said actual source location to a ray path-corrected source position and from a ray path-corrected receiver position to below said actual receiver location; and z comprises a depth of a reflection event.

37. The device of claim 35, wherein said velocity correction factor substantially corresponds to:

$$\Delta v_p=v_p[d\Delta d/(d-\Delta d)^2+4z^2]$$

wherein;

$v_p$ comprises the first layer velocity;

d comprises a distance along the common datum level essentially from below said actual source location to below said actual receiver location;

$\Delta d$ comprises a horizontal distance, along said common datum level, from below said actual source location to a ray path-corrected source position and from a ray path-corrected receiver position to below said actual receiver location; and z comprises a depth of a reflection event.

38. The device of claim 33, wherein said means for providing the first layer velocity comprises a means for picking.

39. The device of claim 38, wherein said means for picking further comprises visual inspection of said seismic survey data.

40. The device of claim 38, wherein said means for picking further comprises a means for automatic picking.

41. The device of claim 33, wherein the first layer velocity is predetermined.

42. The device of claim 33, wherein said means for providing the second layer velocity comprises:

a means for providing a travel time for said seismic survey data set;

a means for providing a travel distance for said seismic survey data set; and a means for dividing said travel distance by said travel time.

43. The device of claim 42, wherein said travel time essentially corresponds to:

$$t=(d^2+4z^2)^{1/2}/(v_p+\Delta v_p);$$

wherein $v_p$ comprises the second layer velocity;

d comprises a horizontal distance essentially from said source location to said receiver location;

$\Delta v_p$ comprises a velocity correction factor; and z comprises a depth of a reflection event.

44. The device of claim 43, wherein said velocity correction factor substantially corresponds to:

$$\Delta v_p=[v_p((1+(2d\Delta d-(\Delta d)^2)/(d-\Delta d)^2+4z^2))^{1/2}-1]$$

wherein;

$v_p$ comprises the second layer velocity;

d comprises a distance along the common datum level essentially from below said actual source location to below said actual receiver location;

$\Delta d$ comprises a horizontal distance, along said common datum level, from below said actual source location to a ray path-corrected source position and from a ray path-corrected receiver position to below said actual receiver location; and z comprises a depth of a reflection event.

45. The device of claim 43, wherein said velocity correction factor substantially corresponds to:

$$\Delta v_p=v_p[d\Delta d/(d-\Delta d)^2+4z^2]$$

wherein;

$v_p$ comprises the second layer velocity;

d comprises a distance along the common datum level essentially from below said actual source location to below said actual receiver location;

$\Delta d$ comprises a horizontal distance, along said common datum level, from below said actual source location to a ray path-corrected source position and from a ray path-corrected receiver position to below said actual receiver location; and z comprises a depth of a reflection event.

46. The device of claim 33, wherein said means for providing the second layer velocity comprises a means for picking.

47. The device of claim 46, wherein said means for picking further comprises visual inspection of said seismic survey data.

48. The device of claim 46, wherein said means for picking further comprises a means for automatic picking.

49. The device of claim 33, wherein said means for providing the first layer ray parameter is dependent upon said means for providing the first layer velocity and said means for providing the second layer velocity.

50. The device of claim 33, wherein said first layer ray parameter is predetermined.

51. The device of claim 33, wherein said means for providing the second layer ray parameter is dependant upon said means for providing the first layer velocity and said means for providing the second layer velocity.

52. The device of claim 33, wherein said second layer ray parameter is predetermined.

53. The device of claim 33, wherein said means for determining a correction factor comprises a means for determining a distance correction.

54. The device of claim 53, wherein said distance correction further comprises the total distance, along the common datum level, from a location below said actual source location to a ray path-corrected source position and from a ray path-corrected receiver position to a location below said actual receiver location.

55. The device of claim 53, wherein said distance correction is determined in the space-time domain.

56. The device of claim 53, wherein said distance correction is determined in the frequency domain.

57. The device of claim 53, wherein said distance correction corresponds essentially to:

$$[(z_S)(p_d)(v_1)/(1-((p_d)(v_1))^2)^{1/2}]+[(z_r)(p_u)(v_2)/(1-((p_u)(v_2))^2)^{1/2}];$$

wherein
- $z_S$ comprises a distance between said actual source location and said common datum level;
- $z_r$ comprises a distance between said actual receiver location and said common datum level;
- $v_1$ comprises a velocity essentially above said common datum level;
- $v_2$ comprises a velocity essentially above said common datum level;
- $p_d$ comprises a ray parameter for said signal; and
- $p_u$ comprises a ray parameter for said signal; wherein $p_d$ and $p_u$ are dependent upon said means for providing the first layer velocity, means for providing the second layer velocity, means for providing the first layer ray parameter, and means for providing the second layer ray parameter.

58. A device as in claim 33, wherein said means for determining a correction factor comprises a means for determining a time correction.

59. A device as in claim 58, wherein said time correction further comprises the total time traveled by said signal from said actual source location to a ray path-corrected source position and from a ray path-corrected receiver position to said actual receiver location.

60. The device of claim 58, wherein said time correction is dependant upon determining a distance correction.

61. The device of claim 58, wherein said time correction is determined in the space-time domain.

62. The device of claim 58, wherein said time correction is determined in the frequency domain.

63. The device of claim 58, wherein said time correction corresponds essentially to:

$$[(z_S/v_1)(1/(1-(p_dv_1)^2)^{1/2}]+[(z_r/v_2)(1-(p_uv_2)^2)^{1/2}];$$

wherein
- $z_S$ comprises a distance between said actual source location and said common datum level;
- $z_r$ comprises a distance between said actual receiver location and said common datum level;
- $v_1$ comprises a velocity essentially above said common datum level;
- $v_2$ comprises a velocity essentially above said common datum level;
- $p_d$ comprises a ray parameter for said signal; and
- $p_u$ comprises a ray parameter for said signal; wherein $p_d$ and $p_u$ are dependent upon said means for providing the first layer velocity, means for providing the second layer velocity, means for providing the first layer ray parameter, and means for providing the second layer ray parameter.

64. The device of claim 33, wherein said means for applying said correction factor comprises a means for repositioning said ray path end to a ray path-corrected ray path end.

* * * * *